(12) United States Patent
Ye et al.

(10) Patent No.: US 12,470,745 B2
(45) Date of Patent: Nov. 11, 2025

(54) BIAS VALUE DETERMINATION FOR CHROMA-FOR-LUMA (CfL) MODE

(71) Applicant: Tencent America LLC, Palo Alto, CA (US)

(72) Inventors: Jing Ye, Palo Alto, CA (US); Xin Zhao, Palo Alto, CA (US); Liang Zhao, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 78 days.

(21) Appl. No.: 18/497,896

(22) Filed: Oct. 30, 2023

(65) Prior Publication Data

US 2024/0276012 A1 Aug. 15, 2024

Related U.S. Application Data

(60) Provisional application No. 63/444,180, filed on Feb. 8, 2023.

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/117* (2014.11);
(Continued)

(58) Field of Classification Search
CPC .. H04N 19/593; H04N 19/105; H04N 19/117; H04N 19/132; H04N 19/159;
(Continued)

(56) References Cited

U.S. PATENT DOCUMENTS

2015/0117554 A1 4/2015 Chong et al.
2019/0230352 A1 7/2019 Heo et al.
(Continued)

FOREIGN PATENT DOCUMENTS

WO WO 2023050072 A1 4/2023

OTHER PUBLICATIONS

Jianle Chen et al., "Algorithm Description for Versatile Video Coding and Test Model 10 (VTM 10)", JVET-S2002, Video Experts Team (JVET) of ITU-T SG 16 WP 3 and ISO/IEC JTC 1/SC 29/WG 11 19th Meeting, Jun. 22-Jul. 1, 2020, 97 pgs.
(Continued)

*Primary Examiner* — Marnie A Matt
(74) *Attorney, Agent, or Firm* — Morgan, Lewis & Bockius LLP

(57) ABSTRACT

The various implementations described herein include methods and systems for coding video. In one aspect, a video bitstream includes distinct coding blocks of a current image frame and signals a cross-component intra prediction mode. A method includes for each distinct coding block, identifying a chroma component, a luma sample co-located with the chroma component, and neighboring luma samples of the luma sample. The method includes deriving a respective bias value based on a set of luma samples within a reference area of the respective coding block, which includes one or more coding blocks that are adjacent to, and decoded prior to, the respective coding block in the current image frame. The method further includes combining the luma sample, the neighboring luma samples, and the respective bias value to generate the chroma component and reconstructing the distinct coding blocks including the chroma component of each distinct coding block.

21 Claims, 9 Drawing Sheets

(51) Int. Cl.
*H04N 19/117* (2014.01)
*H04N 19/132* (2014.01)
*H04N 19/159* (2014.01)
*H04N 19/167* (2014.01)
*H04N 19/172* (2014.01)
*H04N 19/176* (2014.01)
*H04N 19/186* (2014.01)
*H04N 19/70* (2014.01)

(52) U.S. Cl.
CPC ......... *H04N 19/132* (2014.11); *H04N 19/159* (2014.11); *H04N 19/167* (2014.11); *H04N 19/172* (2014.11); *H04N 19/176* (2014.11); *H04N 19/186* (2014.11); *H04N 19/70* (2014.11)

(58) Field of Classification Search
CPC .. H04N 19/167; H04N 19/172; H04N 19/176; H04N 19/186; H04N 19/70; H04N 19/11
USPC ..................................................... 375/240.02
See application file for complete search history.

(56) References Cited

U.S. PATENT DOCUMENTS

| | | | |
|---|---|---|---|
| 2021/0092395 A1 | 3/2021 | Zhang et al. | |
| 2021/0195200 A1* | 6/2021 | Chen ................ | H04N 19/176 |
| 2021/0235072 A1 | 7/2021 | Ko et al. | |
| 2021/0297656 A1 | 9/2021 | Ma et al. | |
| 2021/0329261 A1 | 10/2021 | Ma et al. | |
| 2021/0409732 A1 | 12/2021 | Zhao et al. | |
| 2022/0030257 A1 | 1/2022 | Deng et al. | |
| 2022/0078481 A1 | 3/2022 | Lainema | |
| 2022/0239897 A1 | 7/2022 | Deng et al. | |
| 2022/0248025 A1 | 8/2022 | Deng et al. | |
| 2022/0264101 A1 | 8/2022 | Koo et al. | |
| 2022/0286674 A1 | 9/2022 | Wang et al. | |
| 2022/0295061 A1 | 9/2022 | Zhang et al. | |
| 2022/0345718 A1* | 10/2022 | Rosewarne ......... | H04N 19/593 |
| 2022/0385926 A1 | 12/2022 | Deng et al. | |
| 2023/0057680 A1* | 2/2023 | Ma ...................... | H04N 19/59 |
| 2023/0117813 A1 | 4/2023 | Deng et al. | |
| 2023/0217026 A1 | 7/2023 | Li et al. | |
| 2023/0344990 A1 | 10/2023 | Deng et al. | |
| 2023/0345015 A1 | 10/2023 | Ye et al. | |
| 2023/0370602 A1* | 11/2023 | Onno .................. | H04N 19/105 |
| 2024/0236363 A1 | 7/2024 | Jung et al. | |
| 2024/0244254 A1 | 7/2024 | Jung et al. | |
| 2024/0397062 A1* | 11/2024 | Xu ..................... | H04N 19/147 |

OTHER PUBLICATIONS

Pekka Astola, et al, "AHG12: Convolutional Cross-Component Model (CCCM) for Intra Prediction", Document: JVET-Z0064-v1, Joint Video Experts Team (JVET) of ITU-T SG 16 WP 3 and ISO/IEC JTC 1/SC 29 26th Meeting, Apr. 20-29, 2022, 5 pgs.

Peter de Rivaz, et al., "AV1 Bitstream & Decoding Process Specification", The Alliance for Open Media, Jan. 8, 2019, 681 pgs. Retrieved from the Internet: https://aomediacodec.github.io/av1-spec/av1-spec.pdf.

Xin Zhao et al., "Tool Description for AOMedia Video Model (AVM)", Document: CWG-B100_v1, Alliance for Open Media Codec Working Group, Jan. 3, 2022, 52 pgs.

Yue Chen et al., "An Overview of Core Coding Tools in the AV1 Video Codec", 2018 IEEE Picture Coding Symposium, San Francisco, CA, USA, 5 pgs.

Tencent Technology, ISR/WO, PCT/US2023/036535, Feb. 22, 2024, 17 pgs.

Tencent Technology, ISR/WO, PCT/US2023/036479, Mar. 14, 2024, 13 pgs.

Tencent Technology, ISR/WO, PCT/US2023/036481, Mar. 4, 2024, 16 pgs.

Tencent Technology, ISR/WO, PCT/US2023/036534, Feb. 22, 2024, 12 pgs.

* cited by examiner

BIAS VALUE DETERMINATION FOR CHROMA-FOR-LUMA (CfL) MODE

RELATED APPLICATIONS

This application claims priority to U.S. Provisional Patent Application No. 63/444,180, entitled "Improved Bias Value for CfL Mode," filed Feb. 8, 2023, which is hereby incorporated by reference in its entirety.

TECHNICAL FIELD

The disclosed embodiments relate generally to video coding, including but not limited to systems and methods for determining chroma samples from associated luma samples in cross component intra prediction of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes applying a bias term to implement cross component intra prediction of video data in a cross-component intra prediction (CCIP) mode where each of a plurality of chroma samples of a current coding block is determined based on one or more luma samples. For example, the CCIP mode includes a cross-component linear model mode (CCLM) and a convolutional cross-component mode (CCCM). In the CCLM mode, a chroma sample is converted from a reconstructed luma sample that is co-located with the chroma sample based on a linear model. In the CCCM mode, a chroma sample is predicted from a plurality of reconstructed luma samples that is located based on a filter shape of a filter having a plurality of weighing factors. In both of the CCLM and CCCM modes, the reconstructed luma samples are down-sampled to match a lower resolution chroma grid when chroma sub-sampling is used, and there is an option of using a single model or multi-model variant. In some embodiments, the multi-model variant uses two models, one derived based on luma samples above an average luma reference value and the other derived based on the rest of the luma samples. Further, in some embodiments, such a multi-model CCCM mode is selected for prediction units having at least 128 reference samples available.

In some embodiments, the CCCM mode is associated with a filter having a plurality of weighing factors (e.g., a 7-tap filter, a 5-tap filter). The plurality of weighing factors are applied jointly two additional weighing factors to combine luma samples, a nonlinear term, and a bias term. For example, a cross-shaped 5-tap filter has five inputs consists of a center (C) luma sample that is collocated with a center chroma sample to be predicted and four neighboring luma samples, including an above/north (N) neighboring sample, a below/south (S) neighboring sample, a left/west (W) neighboring sample, and a right/east (E) neighboring sample. The nonlinear term P represents a square of the center luma sample C that is scaled to a sample value range. The bias term B represents a scalar offset between the inputs and output, and for example, is set to a middle chroma value (512 for 10-bit content). In some embodiments, an output of the filter is determined as a convolution between the weighing factors ci (also called filter coefficients $c_i$) and the input luma samples, and clipped to a range of valid chroma samples. Various embodiments of this application are directed to determining the bias term B in cross component intra prediction of video data (e.g., in the CCCM mode), e.g., by adaptively deriving a respective bias value for each coding block of a current image frame based on a set of one or more luma samples within a reference area of the respective coding block.

In accordance with some embodiments, a method of video decoding is provided. The method includes receiving a video bitstream including a plurality of distinct coding blocks of a current image frame. The video bitstream includes a syntax element for a cross-component intra prediction (CCIP) mode indicating each chroma component of the plurality of distinct coding blocks is determined based on one or more luma samples. The method further includes deriving a respective bias value based on a set of one or more luma samples within a reference area of a respective coding block in the current image frame. The reference area includes one or more coding blocks that are adjacent to, and decoded prior to, the respective coding block. The method further includes reconstructing the plurality of coding blocks including the respective coding block based at least on the derived bias value.

In accordance with some embodiments, a method of video encoding is provided. The method includes encoding each respective coding block of a plurality of distinct coding blocks of a current image frame. Encoding each respective coding block further includes identifying a first chroma component of the respective coding block and a first luma sample co-located with the first chroma component in the respective coding block, identifying a plurality of neighboring luma samples of the first luma sample, and deriving a respective bias value based on a set of one or more luma samples within a reference area of the respective coding block in the current image frame. The reference area includes one or more coding blocks that are adjacent to, and will be decoded prior to, the respective coding block. The method further includes generating a video bitstream including the plurality of distinct coding blocks of the current image frame. The video bitstream includes a syntax element for a cross-component intra prediction (CCIP) mode indicating each chroma component of the plurality of distinct coding blocks is determined based on one or more luma samples.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes applying a bias term to implement cross component intra prediction of video data in a cross-component intra prediction (CCIP) mode where each of a plurality of chroma samples of a current coding block is determined based on one or more luma samples. For example, the CCIP mode includes a cross-component linear model mode (CCLM) and a convolutional cross-component mode (CCCM). In the CCLM mode, a chroma sample is converted from a reconstructed luma sample that is co-located with the chroma sample based on a linear model. In the CCCM mode, a chroma sample is predicted from a plurality of reconstructed luma samples that is located based on a filter shape of a filter having a plurality of weighing factors. In both of the CCLM and CCCM modes, the reconstructed luma samples are down-sampled to match a lower resolution chroma grid when chroma sub-sampling is used, and there is an option of using a single model or multi-model variant. In some embodiments, the multi-model variant uses two models, one derived based on luma samples above an average luma reference value and the other derived based on the rest of the luma samples. Further, in some embodiments, such a multi-model CCCM mode is selected for prediction units having at least 128 reference samples available.

In some embodiments, the CCCM mode is associated with a filter having a plurality of weighing factors (e.g., a 7-tap filter, a 5-tap filter). The plurality of weighing factors are applied jointly two additional weighing factors to combine luma samples, a nonlinear term, and a bias term. For example, a cross-shaped 5-tap filter has five inputs consists of a center (C) luma sample that is collocated with a center chroma sample to be predicted and four neighboring luma samples, including an above/north (N) neighboring sample, a below/south (S) neighboring sample, a left/west (W) neighboring sample, and a right/cast (E) neighboring sample. The nonlinear term P represents a square of the center luma sample C that is scaled to a sample value range. The bias term B represents a scalar offset between the inputs and output, and for example, is set to a middle chroma value (512 for 10-bit content). Various embodiments of this application are directed to determining the bias term B in cross component intra prediction of video data (e.g., in the CCCM mode), e.g., by adaptively deriving a respective bias value for each coding block of a current image frame based on a set of one or more luma samples within a reference area of the respective coding block. Further, in some embodiments, an output of the filter is determined as a convolution between the weighing factors ci (also called filter coefficients ci) and the input luma samples, and clipped to a range of valid chroma samples.

Figure 1:
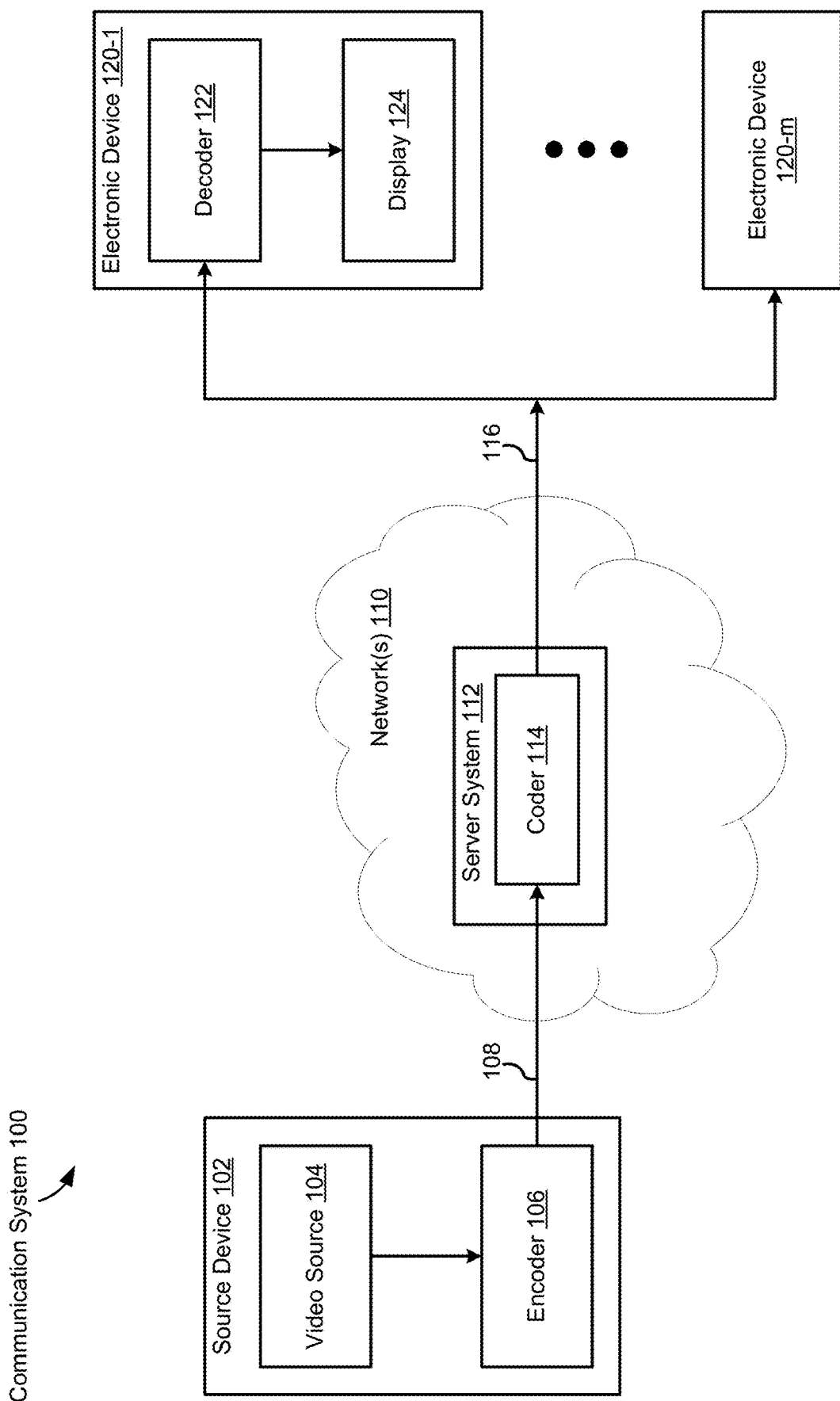
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
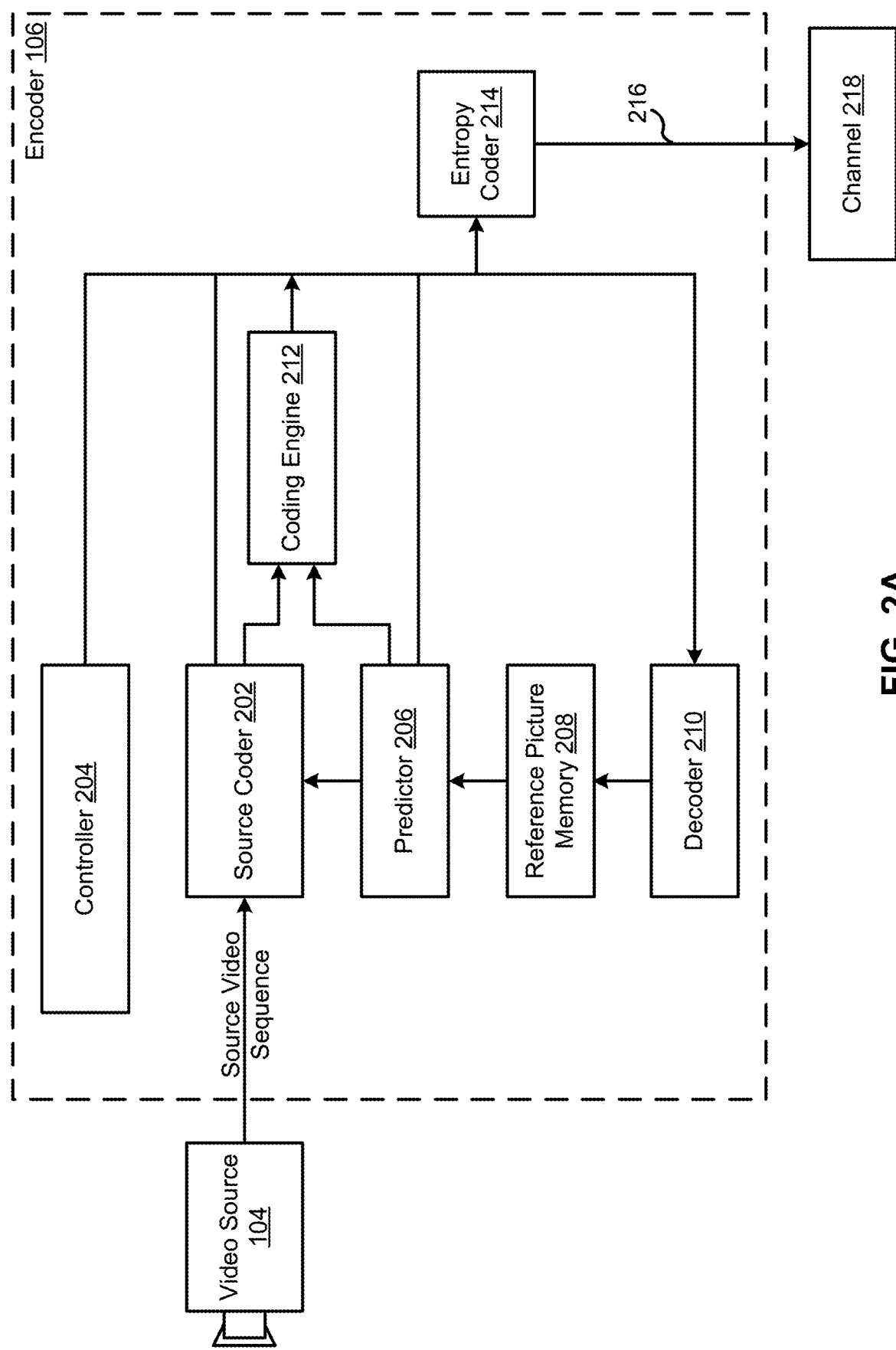
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color space (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously coded frames from the video sequence that were designated as reference image frames. In this manner, the coding engine 212 codes differences between pixel blocks of an input frame and pixel blocks of reference image frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference image frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference image frames and may cause reconstructed reference image frames to be stored in the reference picture memory 208. In this manner, the encoder component 106 stores copies of reconstructed reference image frames locally that have common content as the reconstructed reference image frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/ software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
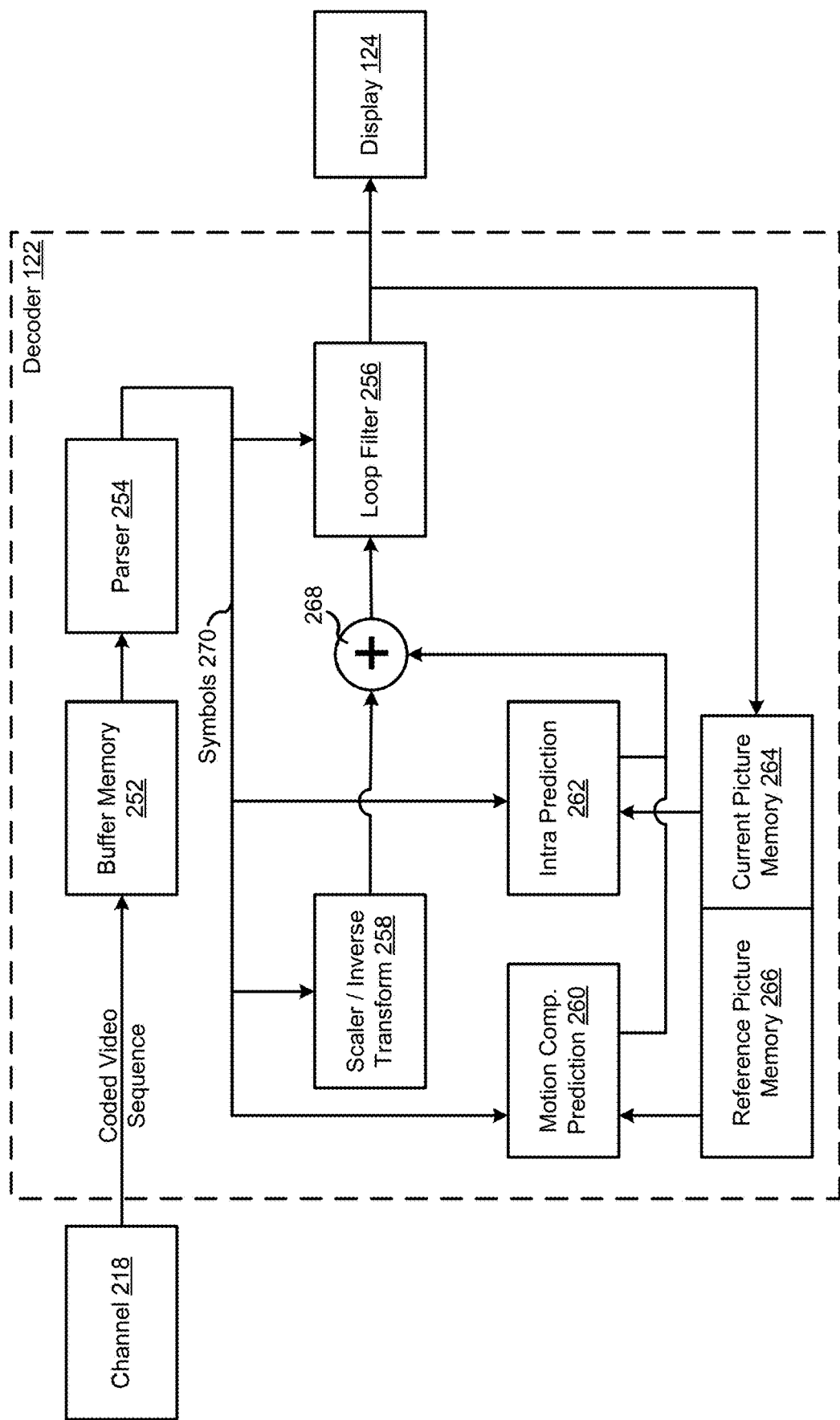
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
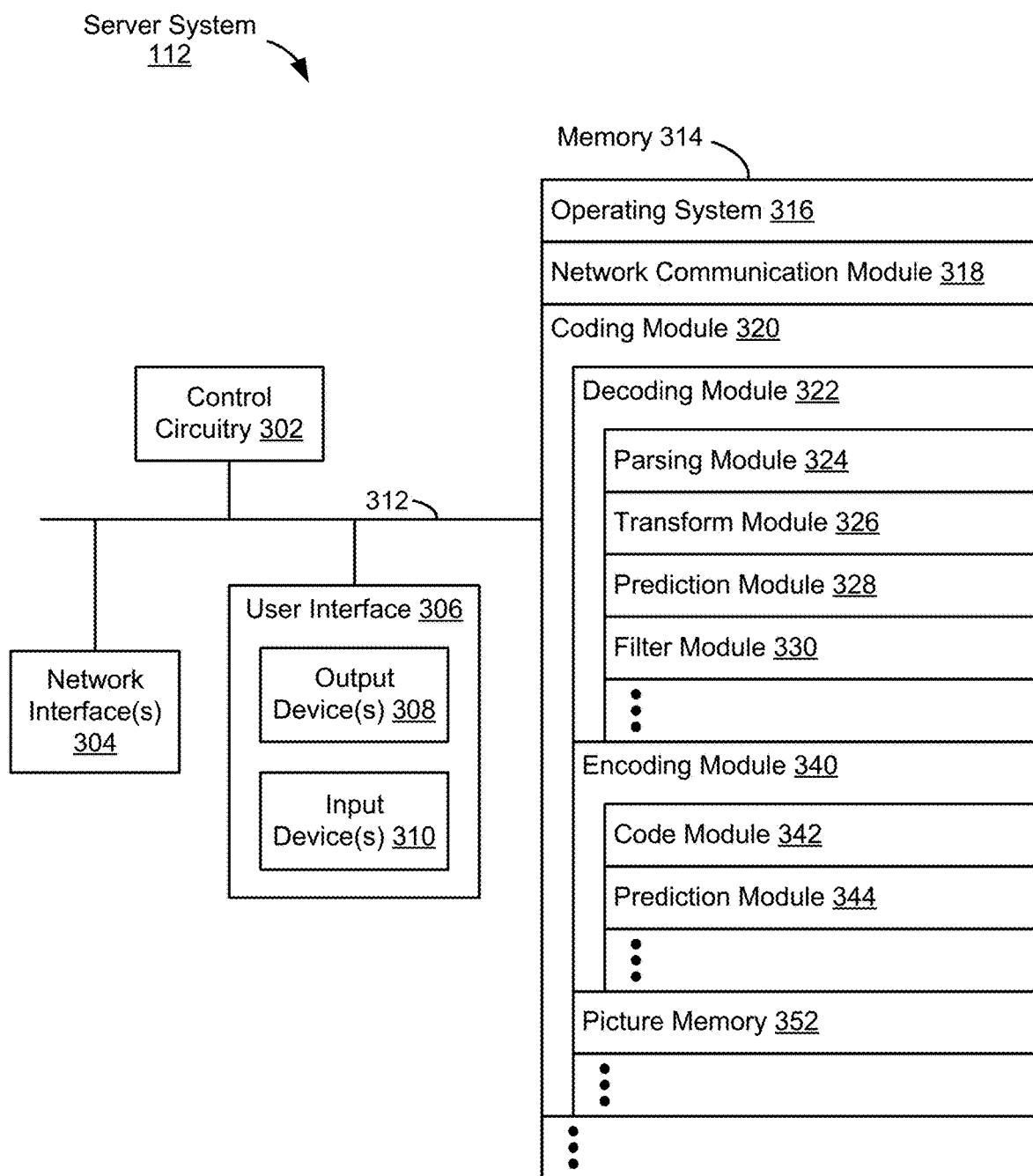
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous Javascript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
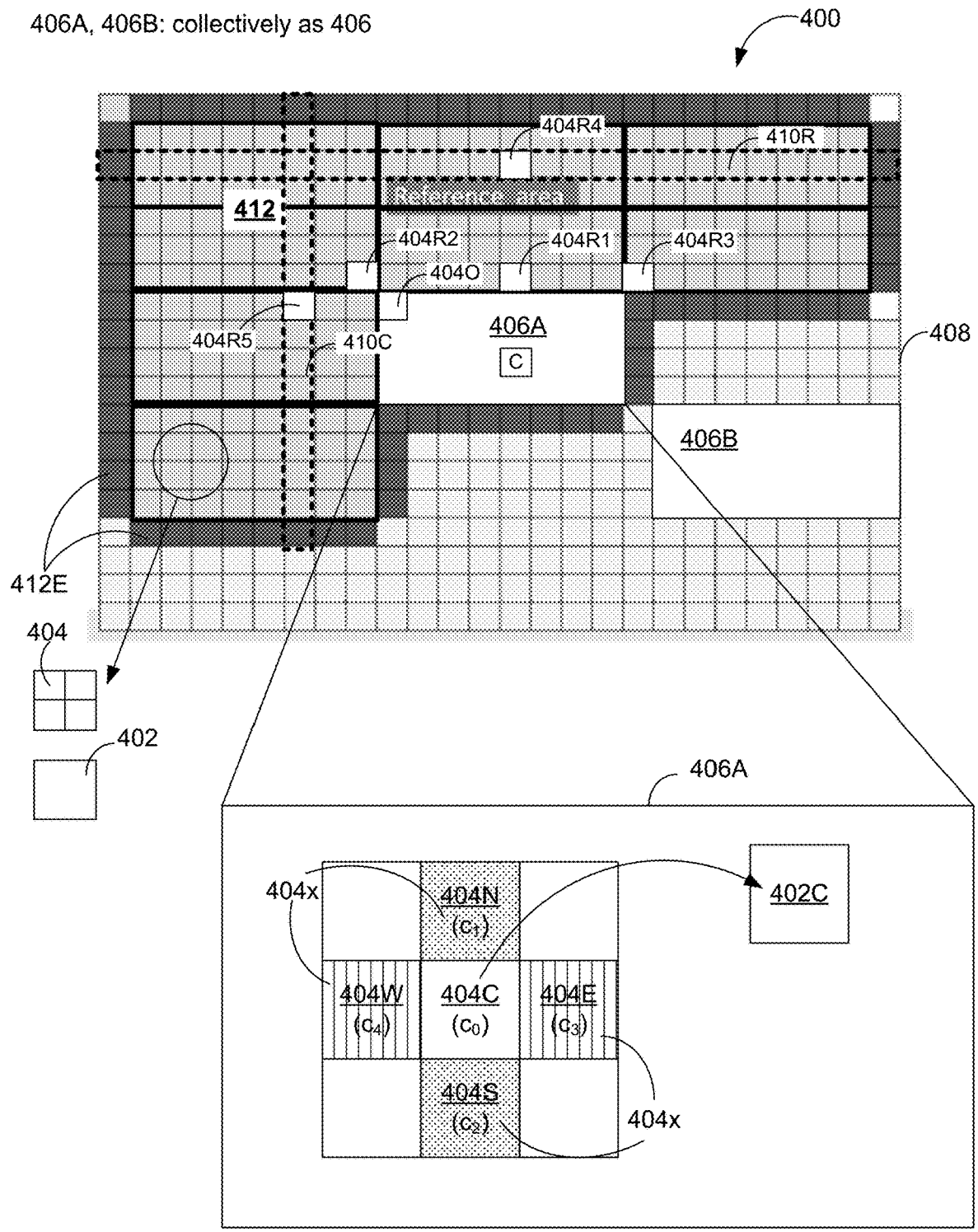
FIG. 4 illustrates an example scheme for generating a chroma sample from a plurality of luma samples in a CCCM mode, in accordance with some embodiments.

FIG. 4 illustrates an example scheme 400 for generating a chroma sample 402 from a plurality of luma samples 404 in a CCCM mode, in accordance with some embodiments. In some embodiments, each of a plurality of distinct coding blocks 406 (e.g., first coding block 406A, second coding block 406B) of a current image frame 408 is coded in a cross-component intra prediction (CCIP) mode. In the CCIP mode, a decoder 122 (FIG. 2B) determines each chroma sample 402 of the plurality of coding blocks 406 based on one or more luma samples 404 that have been reconstructed. The CCIP mode includes the CCCM mode in which a first chroma sample 402C is generated by combining a plurality of reconstructed luma samples 404 (e.g., samples 404C, 404N, 404S, 404W, and 404E) using a plurality of weighing factors ($c_i$). For each respective coding block 406 (e.g., the first coding block 406A), the plurality of reconstructed luma samples includes a first luma sample 404C of the respective coding block 406 that is co-located with the first chroma sample 402C and a plurality of neighboring luma samples 404x that is located adjacent to the first luma sample 404C, e.g., based on a filter shape of a filter. A respective bias value B is determined based on a set of one or more luma samples 404 within a reference area 412 of the respective coding block 406 in the current image frame 408. The reference area 412 includes one or more coding blocks that are adjacent to, and decoded prior to, the respective coding block 406A. The first luma sample 402C, the plurality of neighboring luma samples 404x, and the respective bias value B are combined to generate the first chroma sample 402C. The decoder 122 reconstructs the plurality of distinct coding blocks 406 including the first chroma component 402C of each respective coding block 406. In some embodiments, the first coding block 406A is distinct from the second coding block 406B, and the respective bias values B of the first coding block 406A and the second coding block 406B are determined based on distinct reference areas of the coding blocks 406A and 406B.

The filter shape of the filter determines a number of the plurality of neighboring luma samples 404x and their locations with respect to the first luma sample 404C. For example, a cross-shaped 5-tap filter has five inputs consists of the first luma sample 404C that is collocated with the chroma sample 402C to be predicted and four neighboring luma samples 404x, including a north/above neighboring sample 404N, a south/below neighboring sample 404S, a west/left neighboring sample 404W, and an east/right neighboring sample 404E. Each of the first luma sample 404C and neighboring luma samples 404x corresponds to a respective weighing factor (e.g., $c_0$, $c_1$, $c_2$, $c_3$, or $c_4$), which is also called filter coefficient.

In some embodiments, the plurality of weighing factors includes the weighing factors (e.g., $c_0$-$c_4$) applied as filter coefficients in the filter and two additional weighing factors (e.g., $c_5$, $c_6$). A weighted combination is determined for linear components of luma samples 404C and 404x, a nonlinear term P, and a bias term B, and applied to generate the first chroma sample 402C according to an equation 414. In some embodiments, a weighing factor $c_0$ corresponding to the first luma sample 404C is greater than remaining weighing factors (e.g., $c_1$-$c_6$) of the plurality of weighing factors. The nonlinear term P represents a square of the first luma sample 404C that is scaled to a sample value range as follows:

$$P = (C*C) + midVal \gg bitDepth \quad (1)$$

where C represents a value of the first luma sample 404C, midVal represents an integer to which an average of two bounds of a range of luma values is rounded, and bitDepth is a bit depth of the luma values. For example, the bit depth of the luma value is 10, and the nonlinear term P is represented as:

$$P = (C*C + 512) \gg 10 \quad (2)$$

The bias term B represents a scalar offset between the inputs and output, and for example, is set to a middle chroma value (512 for 10-bit content). In some embodiments, an output of the filter is determined as a convolution between the filter coefficients and the inputs (e.g., the first luma sample 404C and neighboring luma samples 404x), and clipped to a range of valid chroma samples 404.

In some embodiments, the reference area 412 of each respective coding block 406 includes one or more coding blocks (e.g., 8 coding blocks in FIG. 4) that are decoded prior to, the respective coding block 406. In some embodiments, a subset of the one or more coding blocks is immediately adjacent to the respective coding block 406. In some embodiments, a subset of the one or more coding blocks is separated from the respective coding block 406 by one or more coding blocks. In some embodiments, the reference area 412 includes at least a portion of a plurality of rows above the respective coding block 406 and/or a portion of a plurality of columns to the left of the respective coding block 406. For example, referring to FIG. 4, the reference area 412 includes 7 rows of chroma samples above the respective coding block 406 and 9 columns of chroma samples to the left of the respective coding block 406. In some embodiments, the reference area 412 extends one coding block width to the right of a right boundary of the respective coding block 406, and one coding block height below a bottom boundary of the respective coding block 406. In some embodiments, the reference area 412 is adjusted to include only available samples. Extensions 412E to the reference area 412 are needed to support side samples of the cross-shaped filter and are padded in unavailable areas.

In some embodiments, for the respective coding block 406, the set of one or more luma samples within the reference area 412 include a single luma sample (e.g., 404R1) within the reference area 412 of the respective coding block 406 in the current image frame 408. Alternatively, in some embodiments, for the respective coding block 406, the respective bias value B is equal to an average of the set of one or more luma samples including a plurality of luma samples (e.g., 404R1, 404R2, and 404R3) within the reference area 412 of the respective coding block 406 in the current image frame 408.

In some embodiments, for the respective coding block 406, the set of one or more luma samples within the reference area 412 includes one or more rows 410R of luma samples above the respective coding block 406 in the reference area 412, and the respective bias value is equal to a median luma value of the one or more rows of luma samples. Alternatively, in some embodiments, for the respective coding block 406, the set of one or more luma samples within the reference area 412 includes one or more rows 410R of luma samples above the respective coding block 406 in the reference area 412, and the set of one or more luma samples includes a reference luma sample 404R4 that is physically located substantially at a center of the one or more rows 410R of luma samples. The respective bias value is equal to a luma value of the reference luma sample 404R4. In some embodiments, each row 410R of luma samples includes an even number of luma samples, and the reference luma sample 404R4 corresponds to two luma samples immediately adjacent to the center. The respective bias value B is equal to an average of the two luma samples immediately adjacent to the center.

In some embodiments, for the respective coding block 406 (e.g., block 406A), the set of one or more luma samples 404 of the reference area 412 includes one or more columns 410C of luma samples located on the left of the respective coding block 406 in the reference area 412, and the respective bias value B is equal to a median luma value of the one or more columns 410C of luma samples. Alternatively, in some embodiments, for the respective coding block 406 (e.g., block 406A), the set of one or more luma samples 402 of the reference area 412 includes one or more columns 410C of luma samples located on the left of the respective coding block 406 in the reference area 412, and the set of one or more luma samples 404 includes a reference luma sample 404R5 that is physically located substantially at a center of the one or more columns 410C of luma samples. The respective bias value B is equal to a luma value of the reference luma sample 404R5. In some embodiments, the column 410C of luma samples includes an even number of luma samples, and the reference luma sample 404R5 corresponds to two luma samples immediately adjacent to the center. The respective bias value B is equal to an average of the two luma samples immediately adjacent to the center.

In some embodiments, as explained above, the first luma sample 404C (C), the plurality of neighboring luma samples 404x (e.g., N, S, W, E), and the bias value B to generate the first chroma component 402C (preChromaVal) based on equation 414 as follows:

$$predChromaVal = c_0 C + c_1 N + c_2 S + c_3 E + c_4 W + c_5 P + c_6 B$$

where $c_0$-$c_6$ are weighing factors. In some embodiments, the decoder 122 reduces each of the first luma sample 404C and the plurality of neighboring luma samples 404x with an offset luma value before applying them in the equation 414. Further, in some embodiments, the decoder 122 clips each of the first luma sample 404C and the plurality of neighboring luma samples 404x that has been reduced with the offset luma value before applying them in the equation 414. Additionally, in some embodiments, the offset luma value is selected from an average of the first luma sample 404C and the plurality of neighboring luma samples 404x, an average of luma samples in a top reference region 402T (FIG. 5A) of the reference area 412 that is located above the respective coding block 406, an average of luma samples in a left reference region 402L (FIG. 5A) of the reference area that is located on the left of the respective coding block 406, a luma value of a single luma sample 404O located at a top left corner of the respective coding block 406, a median luma value of one or more rows 410R of luma samples located above the respective coding block 406 within the reference area 412, a luma value of a luma sample 404R4 that is physically located substantially at a center of the one or more rows 410R of luma samples, a median luma value of one or more columns 410C of luma samples located on the left of the respective coding block 406 within the reference area 412, and a luma value of a luma sample 404R5 that is physically located substantially at a center of the one or more columns 410C of luma samples.

In some embodiments, the CCIP mode includes a multi-chroma from luma (multi-CfL) mode. The decoder 122 determines that the plurality of distinct coding blocks 405 is encoded in the multi-CfL mode. In accordance with a determination that the respective coding block 406 is encoded in the multi-CfL mode, the plurality of neighboring luma samples 404x of the first luma sample 404C of the respective coding block are identified based on a filter shape of a filter, and the first chroma component 402C of the respective coding block 406 is a weighted sum of the first luma sample 404C, the plurality of neighboring luma samples 404x, an output of a non-linear function of the first luma sample 404C, and the respective bias value B based on the equation 414. In some embodiments, the first luma sample 404C, the plurality of neighboring luma samples 404x, and the bias value B are combined using a plurality of weighing factors to generate the first chroma component 402C, and each weighing factor includes an integral portion and a fractional portion.

In some embodiments, the filter shape of the filter is a cross shape and has 5 taps. In accordance with the filter shape, the plurality of neighboring luma samples 404x includes four neighboring luma samples 404N, 404S, 404W, and 404E arranged in the cross shape centered at the first luma sample 404C. Further, in some embodiments, the plurality of weighing factors of the filter includes 7 weighing factors corresponding to the first luma sample 404C, the four neighboring luma samples 404x, an output of a non-linear function of the first luma sample 404C (e.g., P), and a bias component (e.g., B), respectively.

In some embodiments, the reconstructed luma samples 404 are down-sampled to match a lower resolution chroma grid when chroma sub-sampling is used. In some embodiments, the CCCM mode is implemented using a single model or a multi-model variant. The single model uses a single equation 414 including a single set of weighing factors for determining chroma samples 402 of the respective coding block 406. Each of the single set of weighing factors is received with the video bitstream or derived from reconstructed samples of the reference area 412. Conversely, in some embodiments, the multi-model variant uses two models corresponding to two sets of weighing factors. One model is derived based on samples above an average luma reference value of the reference area 412, and the other is derived based on the rest of the luma samples of the reference area 412. Further, in some embodiments, such a multi-model CCCM mode is used to reconstruct prediction units (e.g., the respective coding block 406) having at least 128 reference samples available.

In some embodiments, the plurality of weighing factors (e.g., $c_0$-$c_6$ in equation 414) is determined by minimising a mean square error (MSE) between predicted and reconstructed chroma samples 402 in the reference area 412. The MSE minimization is performed by calculating autocorrelation matrix for the luma samples 404 and a cross-correlation vector between the luma samples 404 and chroma samples 402 in the reference area 412. Autocorrelation matrix is processed with LDL decomposition and the plurality of weighing factors is calculated using back-substitution. The process follows roughly the calculation of filter coefficients of an adaptive loop filter (ALF) in enhanced compression model (ECM) video coding. LDL decomposition does not use square root operations and uses only integer arithmetic operations.

In some embodiments, usage of the CCCM mode is signaled in the video bitstream 116 with a context-adaptive binary arithmetic coding (CABAC) coded flag on a prediction unit level. A new CABAC context is included to support the CCCM mode. In some situations, CCCM is considered a sub-mode of CCLM. The CCCM flag is signaled in the video bitstream 116 if intra prediction mode is LM_CHROMA_IDX (to enable single mode CCCM) or MMLM_CHROMA_IDX (to enable multi-model CCCM).

In some embodiments, an encoder 106 encodes each respective coding block 406 of a plurality of distinct coding blocks of the current image frame 408 into the video bitstream. The encoder 106 identifies a first chroma component 402C of the respective coding block 406 and a first luma sample 404C co-located with the first chroma component 402C in the respective coding block 406, and a plurality of neighboring luma samples 404x of the first luma sample 402C. e.g., based on a filter shape of a filter. A respective bias value is derived based on a set of one or more luma samples 404 within a reference area 412 of the respective coding block 406 in the current image frame 408. The reference area 412 includes one or more coding blocks 406 that are adjacent to, and will be decoded prior to, the respective coding block 406. The respective bias value is optionally sent with the video bitstream to the decoder 122. The encoder 106 generates the video bitstream including the plurality of distinct coding blocks of the current image frame. The video bitstream signals a cross-component intra prediction (CCIP) mode indicating each chroma component of the plurality of distinct coding blocks is determined based on one or more luma samples.

Figure 5A:
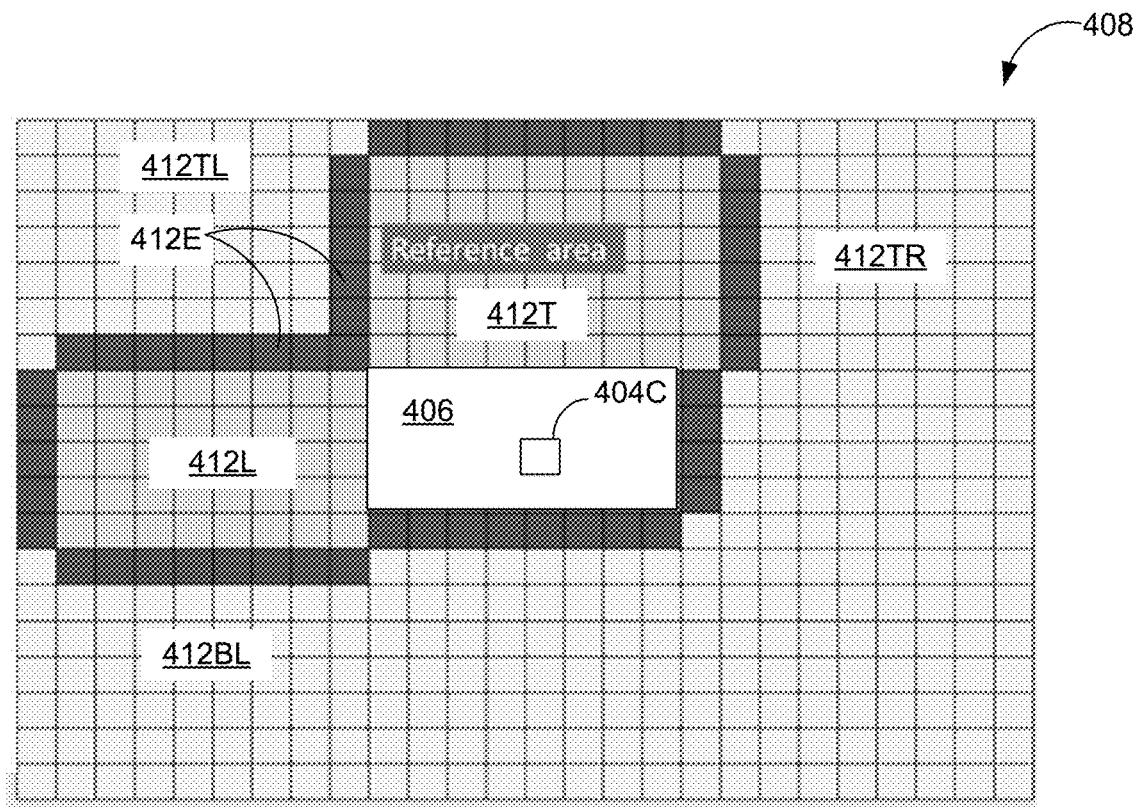
FIG. 5A is a diagram of an example reference area including a plurality of reference regions of a coding block in a current image frame, in accordance with some embodiments.

FIG. 5A is a diagram of an example reference area 412 including a plurality of reference regions of a coding block 406 in a current image frame 408, in accordance with some embodiments. In some embodiments, a respective coding block 406 of a current image frame 408 includes a first chroma sample 402C, which is generated by combining a plurality of reconstructed luma samples 404 (e.g., samples 404C, 404N, 404S, 404W, and 404E) using a plurality of weighing factors (e.g., c0-c6 in equation 414 in FIG. 4). A decoder 122 (FIG. 2) derives a respective bias value B of the respective coding block 406 based on a set of one or more luma samples 404 within a reference area 412 of the respective coding block 406 in the current image frame 408. The reference area 412 includes one or more coding blocks that are adjacent to, and decoded prior to, the respective coding block 406. The first luma sample 402C, the plurality of neighboring luma samples 404x, and the respective bias value B are combined to generate the first chroma sample 402C. The decoder 122 reconstructs the respective coding block 406 including the first chroma sample 402C.

In some embodiments, the one or more coding blocks 412T and 412L of the reference area 412 are immediately adjacent to the respective coding block 406. In some embodiments not shown, the one or more coding blocks are separated from the respective coding block 406 by one or more coding blocks.

In some embodiments, the reference area 412 of the respective coding block 406 (e.g., block 406A in FIG. 4) includes one or more of: a top left reference region 412TL, a top reference region 412T, a top right reference region 412TR, a bottom left reference region 412BL, and a left reference region 412L. Referring to FIG. 5, in this example the reference area 412 includes the top reference region 412T and the left reference region 412L. Each of the reference region includes one or more coding blocks. Stated another way, in some embodiments, the reference area 412 includes at least a portion of a plurality of rows above the respective coding block 406 and/or a portion of a plurality of columns to the left of the respective coding block 406. For example, referring to FIG. 5, the reference area 412 includes a first portion of 7 rows of chroma samples above the respective coding block 406 and a second portion 9 columns of chroma samples to the left of the respective coding block 406. The first portion is determined by a length of the respective coding block 406, and the second portion is determined by a width of the respective coding block 406. In some embodiments, the reference area 412 extends one coding block width to the right of a right boundary of the respective coding block 406, and one coding block height below a bottom boundary of the respective coding block 406. In some embodiments, the reference area 412 is adjusted to include only available samples. Extensions 412E to the reference area 412 are needed to support side samples of the cross-shaped spatial filter and are padded in unavailable areas.

Figure 5B:
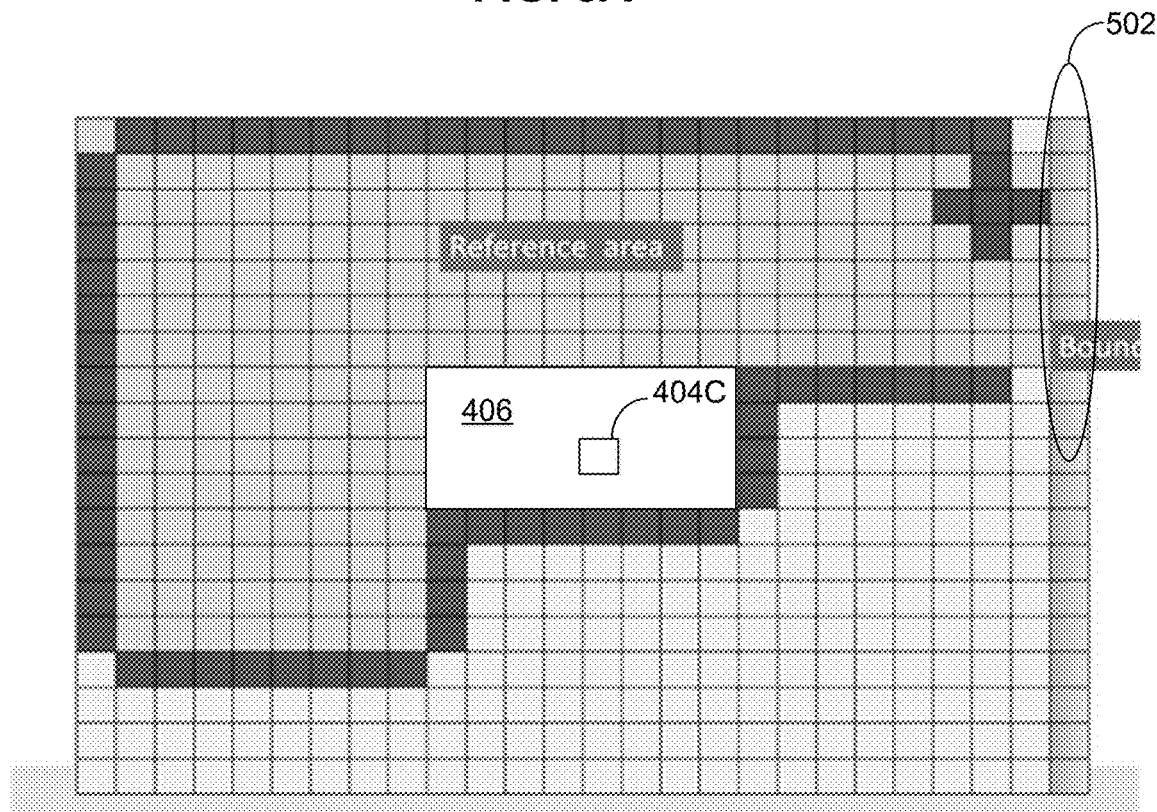
FIG. 5B is a diagram of another example reference area that is adjusted to include only available samples of a coding block in a current image frame, in accordance with some embodiments.

FIG. 5B is a diagram of another example reference area 412 that is adjusted to include only available samples of a coding block 406 in a current image frame 408, in accordance with some embodiments. In some embodiments, the reference area 412 is adjusted to include only available samples. Stated another way, for each respective coding block 406, the decoder 122 (FIG. 2) identifies the reference area 412 of the respective coding block 406. In accordance with a determination that one or more color components are unavailable in a set of columns or rows, which is immediately adjacent to a boundary, the decoder 122 excludes the set of columns or rows from the reference area 412. The boundary includes one of a slice boundary, a super block boundary, a tile boundary, a coding block boundary, and an image frame boundary. For example, the current image frame 408 has a right most column 502 of luma samples that is incomplete. In accordance with a determination that the right most column 502 of luma samples is incomplete, the decoder 122 excludes the rightmost column 502 of luma samples from being applied to determine the respective bias value of the respective coding block 406.

Figure 6A:
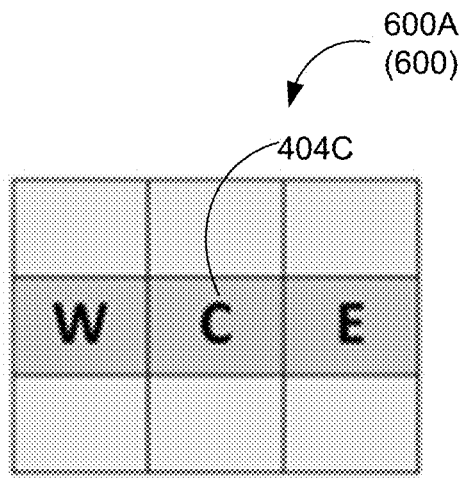
FIGS. 6A-6F are structural diagrams of six example filter shapes of a filter applied to combine luma samples in a CCCM mode, in accordance with some embodiments.
Figure 6B:
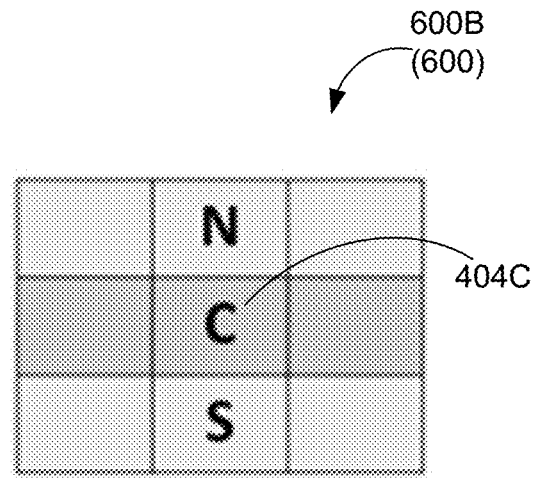
Figure 6C:
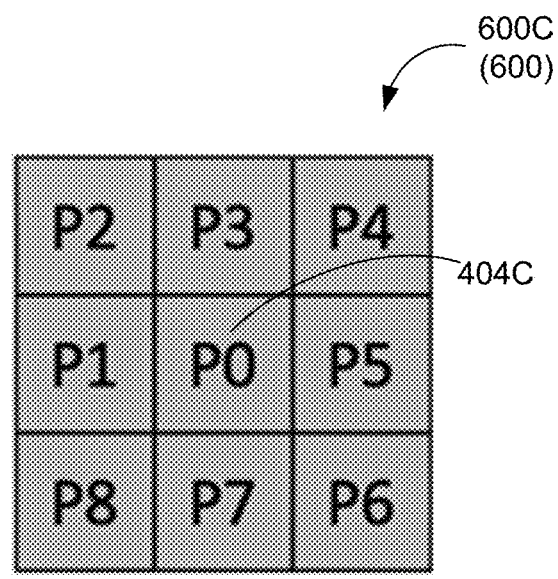
Figures 6D, 6E:
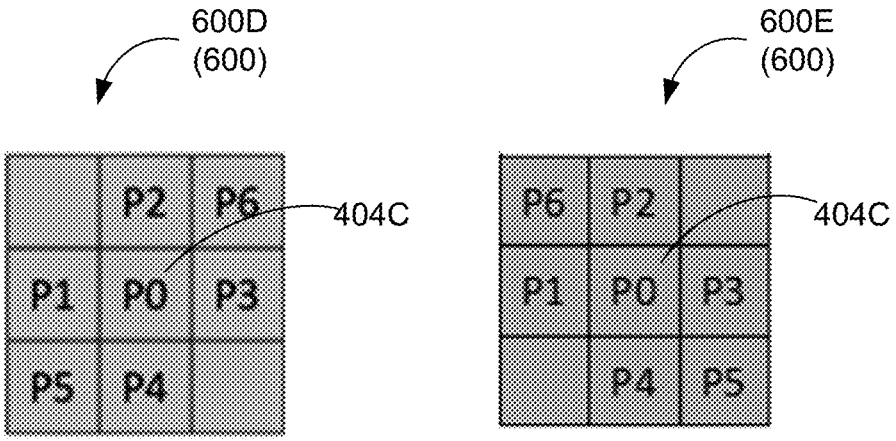
Figure 6F:
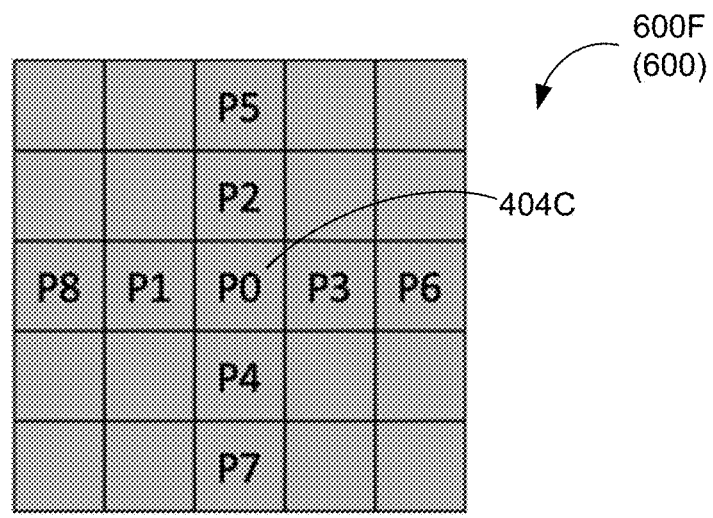

FIGS. 6A-6F are structural diagrams of six example filter shapes 600A-600F of a filter 600 applied to combine luma samples 404 in a CCCM mode, in accordance with some embodiments. Each filter shape 600A-600F is optionally applied to a sequence of image frames including the current image frame 408, the current image frame 408, a slice of the current image frame 408, a superblock including the respective coding block 406, or the respective coding block 406. Referring to FIG. 6A, the filter shape 600A corresponds to an odd number of horizontal luma samples (e.g., 3 horizontal luma samples 404W, 404C, and 404E) centered at the first luma sample 404C (P0). Referring to FIG. 6B, the filter shape 600B corresponds to an odd number of vertical luma samples (e.g., 3 vertical luma samples 404N, 404C, and 404S) centered at the first luma sample 404C (P0). Referring to FIG. 6C, the filter shape 600C corresponds to an array of 3×3 luma samples (P0-P8), which is centered at the first luma sample 404C (P0). Referring to FIGS. 6D and 6E, the filter shape 600C corresponds to a subset of an array of 3×3 luma samples (P0-P6) that centered at the first luma sample 404C and misses two corner luma samples (e.g., a left top luma sample and a right bottom luma sample in FIG. 6D, a left bottom luma sample and a right top luma sample in FIG. 6D). Referring to FIG. 6F, the filter shape is a cross, and corresponds to an odd number of horizontal luma samples (e.g., 5 horizontal luma samples) centered at the first luma sample 404C and an odd number of vertical luma samples (e.g., 5 vertical luma samples) centered at the same first luma sample 404C.

In some embodiments, a video bitstream received by the decoder 122 includes a respective filter index for each respective coding block 406 of the plurality of distinct coding blocks. For each respective coding block 406 (e.g., 406A in FIG. 4), the decoder 122 adaptively selecting one of a plurality of distinct filters based on the respective filter index. Each distinct filter has a respective filter shape and a plurality of weighing factors (also called filter coefficients). The first luma sample 404C, the plurality of neighboring luma samples 404x, and the bias value B are combined using at least the plurality of weighing factors of the selected one of the plurality of distinct filters. Further, in some embodiments, the plurality of distinct filters includes one or more of: (1) a first filter 600C including nine weighing factors and configured to generate the first chroma component 402C as a weighted combination of at least the first luma sample 404C (P0) and eight neighboring luma samples 404x (P1-P8) that immediately surround the first luma sample 404C (P0), (2) a second filter 600D or 600E including seven weighing factors and configured to generate the first chroma component 402C as a weighted combination of at least the first luma sample 404C (P0) and six neighboring luma samples 404x (P1-P6) that immediately surround, and are located symmetrically with respect to, the first luma sample 404C (P0), and (3) a cross-shaped filter 600F including 4k+1 weighing factors and configured to generate the first chroma component 402C as a weighted combination of at least the first luma sample 404C and k neighboring luma samples 404x that is immediately adjacent to the first luma sample 404C from each of two row directions and two column directions, where k is a positive integer (e.g., 2). Further, in some embodiments, the first chroma component 402C is generated further based on at least one of: a fixed bias value, a weighted and adjustable bias value, and a second or higher order of at least one of the first luma sample 404C and the plurality of neighboring luma samples 404x.

Referring to FIG. 6F, in some embodiments, the decoder 122 applies a cross-shaped filter 600F including 4k+1 weighing factors to combine the first luma sample 404C, the plurality of neighboring luma samples 404x, and the bias value B. Each of two row directions and two column directions corresponds to k neighboring luma samples that is immediately adjacent to the first luma sample. Further, in some embodiments, the k neighboring luma samples 404x of each of the two row directions are combined into the first chroma component 402C in the second order, and the k neighboring luma samples 404x of each of the two column directions are combined linearly into the first chroma component 402C. Alternatively, in some embodiments, the k neighboring luma samples 404x of each of the two column directions are combined into the first chroma component 402C in the second order, and the k neighboring luma samples 404x of each of the two row directions are combined linearly into the first chroma component 402C.

Figure 7:
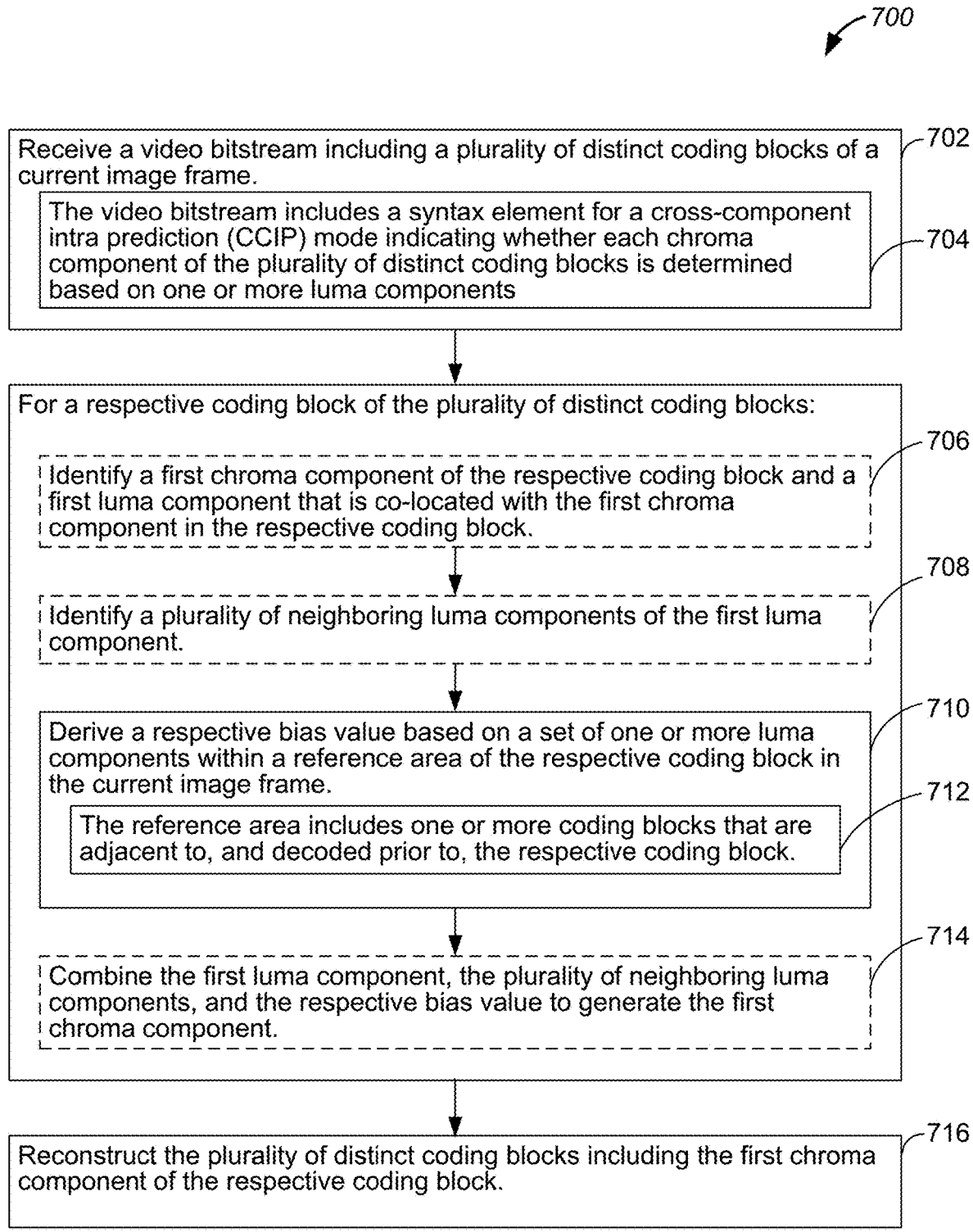
FIG. 7 is a flow diagram illustrating a method of coding video, in accordance with some embodiments.

FIG. 7 is a flow diagram illustrating a method 700 of coding video, in accordance with some embodiments. The method 700 may be performed at a computing system (e.g., the server system 112, the source device 102, or the electronic device 120) having control circuitry and memory storing instructions for execution by the control circuitry. In some embodiments, the method 700 is applied jointly with one or more video codecs, including but not limited to, AV1 AV2, HEVC, VVC, and ECM. In some embodiments, the method 700 is performed by executing instructions stored in the memory (e.g., the coding module 320 of the memory 314) of the computing system. In some embodiments, a current image frame 408 includes a respective coding block 406. In some embodiments, the method 700 is applied to use one color component to predict another color component, and downsampling is required on one or more color components. Further, in some embodiments, the method 700 is applied to use red color components to predict green or blue color components.

In some embodiments, a decoder 122 receives (702) a video bitstream including a plurality of distinct coding blocks of a current image frame, and applies (710) a multi-CfL mode in which the bias value B is determined based on a set of one or more luma samples within a reference area 412. For example, the bias value is an average of the one or more luma samples within the reference area 412, and noted as AvgLuma. In some embodiments, a chroma value of a respective coding block 406 is represented (714) based on an equation 414 (FIG. 4) as follows:

$$predChromaVal = c_0 C + c_1 N + c_2 S + c_3 E + c_4 W + c_5 P + c_6 AvgLuma \quad (3)$$

In some embodiments, the bias value B is set as the value of a predefined neighboring sample within the reference area 412 of the respective coding block 406 in the current image frame 408. For example, the bias value B is set to a luma value of one of a top-left luma sample 404R2 and a bottom right luma sample 404R3 or a chroma value of chroma samples co-located with the luma samples 404R2 and 404R3.

In some embodiments, the bias value B is the average of the above neighboring reconstructed samples of the reference area 412 of the respective coding block 406. In some embodiments, the bias value B is the average of the left neighboring reconstructed samples of the reference area 412 of the respective coding block 406.

In some embodiments, the bias value B can be a middle/median pixel in the above one or multiple lines in the reference area 412 of the respective coding block 406. In some embodiments, the bias value B can be the middle/median pixel in the left one or multiple lines in the reference area 412 of the respective coding block 406.

In some embodiments, the first luma sample 404C and the plurality of neighboring luma samples 404x (e.g., N, S, C, W, E) are offset by an offset value to reduce a value range. In some embodiments, the offset value is the average of luma values of the respective coding block 406. In some embodiments, the offset value is the average of the above and/or left neighboring reconstructed samples of the reference area 412 of the respective coding block 406. In some embodiments, the offset value is top left pixel value of luma and the chroma of the respective coding block 406. In some embodiments, the offset value is the middle/median pixel in the above one or multiple lines in the reference area 412 of the respective coding block 406. In some embodiments, the offset value is the middle/median pixel in the left one or multiple lines in the reference area 412 of the respective coding block 406. In some embodiments, after the luma samples 404C and 404x (e.g., N, S, C, W, E) are subtracted by the offset value, the offset luma sample values 404C and 404x are further clipped to a pre-defined range.

In some embodiments, multi-CfL is applied during the boundary handling, instead of padding unavailable samples, only the available samples are involved in the multi-CfL calculation process. Referring to FIG. 5B, one less column 502 is used on the right boundary. This boundary is one of a slice boundary, a CTU boundary, a super block boundary, a tile boundary, and a picture boundary.

In some embodiments, one or more left samples are not available next to a left boundary, and the left boundary line is reduced (e.g., shifted right by one or more columns). In some embodiments, on or more top samples are not available next to a top boundary, and the top boundary line is reduced (e.g., shifted down by one or more rows), In some embodiments, one or more right samples are not available next to a right boundary, and the right boundary line is reduced (e.g., shifted left by one or more columns). In some embodiments, on or more bottom samples are not available next to a bottom boundary, and the bottom boundary line is reduced (e.g., shifted up by one or more rows), In some embodiments, the filter applied to predict the first chroma sample 402C based on the first luma sample has a filter shape and a number of filter coefficients. The filter shape and number of filter coefficients are optionally pre-defined or adaptively selected. Further, in some embodiments, the filter is adaptively selected from a plurality of filters. An index of a selected filter is signaled into the video bitstream. In some embodiments, depending on picture sizes, unavailable samples near a boundary are padded. In an example, referring to FIG. 6C, the predefined filter contains a central position P0 and eight surround positions P1-P8. The first chroma sample 402C is predicted as follows:

$$predChrome = \qquad (4)$$
$$c_0 P0 + c_1 P1 + c_2 P2 + c_3 P3 + c_4 P4 + c_5 P5 + c_6 P6 + c_7 P7 + c_8 P8$$

With at least 8 luma chroma sample, the coefficients can be computed both at the encoder 106 and decoder 122. Additional constant bias term, a bias term equal to a luma average, or a higher order term is optionally applied to determine the first chroma sample 402.

In some embodiments, depending on picture sizes, unavailable samples near a boundary are padded. In an example, referring to FIG. 6D or 6E, the predefined filter contains a central position P0 and six surround positions P1-P6. The first chroma sample 402C is predicted as follows:

$$predChrome = c_0 P0 + c_1 P1 + c_2 P2 + c_3 P3 + c_4 P4 + c_5 P5 + c_6 P6 \qquad (5)$$

With at least 6 luma chroma sample, the coefficients are computed both at the encoder 106 and decoder 122. Additional constant bias term, a bias term equal to a luma average, or a higher order term is optionally applied to determine the first chroma sample 402.

In some embodiments, depending on picture sizes, unavailable samples near a boundary are padded. In an example, referring to FIG. 6F, the predefined filter is a cross-shaped filter and contains a central position P0 and eight surround positions P1-P8 arranged in a cross shape. The first chroma sample 402C is predicted as follows:

$$predChrome = \qquad (6)$$
$$c_0 P0 + c_1 P1 + c_2 P2 + c_3 P3 + c_4 P4 + c_5 P5 + c_6 P6 + c_7 P7 + c_8 P8$$

With at least 8 luma chroma sample, the coefficients can be computed both at the encoder 106 and decoder 122. Additional constant bias term, a bias term equal to a luma average, or a higher order term is optionally applied to determine the first chroma sample 402.

In some embodiments, one of a plurality of filters is selected adaptively to generate the first chroma sample 402C from the first luma sample 404C and associated neighboring luma samples 404x.

In some embodiments, multiple higher order terms are used during the chroma sample prediction to increase weighting of a subset of sample positions. For example, luma samples located at horizontal positions (including the central positions) are associated with the second order, while luma samples associated with the vertical positions use linear terms.
The first luma sample 404C (C), the plurality of neighboring luma samples 404x (e.g., N, S. W. E), and the bias value B are combined to generate the first chroma component 402C (preChromaVal) based on equation 414 as follows:

$$predChromaVal = c_0 C * C + c_1 N + c_2 S + c_3 E * E + c_4 W * W + c_5 B \qquad (7)$$

In another example, the vertical positions (including the central positions) use second order, while the horizontal positions use linear terms. The first luma sample 404C (C), the plurality of neighboring luma samples 404x (e.g., N, S. W. E), and the bias value B are combined to generate the first chroma component 402C (preChromaVal) based on equation 414 as follows:

$$predChromaVal = c_0 C * C + c_1 N * N + c_2 S * S + c_3 E + c_4 W + c_5 B \qquad (8)$$

In some embodiments, the first chroma sample 402C is fully connected with all the corresponding luma samples 404 (e.g., in the respective coding block 406), and a down sample operation is performed after a fully connected layer. Neural network coefficients of the fully connected layer is pre-trained and stored both at the encoder and decoder side.

Although FIG. 7 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In some implementations, a method 700 is implemented for decoding video data. The method 700 includes receiving (702) a video bitstream including a plurality of distinct coding blocks of a current image frame. The video bitstream includes (704) a syntax element for a cross-component intra prediction (CCIP) mode indicating whether each chroma component of the plurality of distinct coding blocks is determined based on one or more luma samples. The method 700 further includes deriving (710) a respective bias value of a respective coding block based on a set of one or more luma samples within a reference area of the respective coding block in the current image frame. The reference area includes (712) one or more coding blocks that are adjacent to, and decoded prior to, the respective coding block. The method further includes reconstructing (716) the plurality of coding blocks including the respective coding block based at least on the derived bias value.

(A2) In some embodiments of A1, for the respective coding block, the set of one or more luma samples include a single luma sample within the reference area of the respective coding block in the current image frame.

(A3) In some embodiments of A1, for the respective coding block, the respective bias value is equal to an average of the set of one or more luma samples including a plurality of luma samples within the reference area of the respective coding block in the current image frame.

(A4) In some embodiments of any of A1-A3, for the respective coding block, the set of one or more luma samples includes one or more rows of luma samples above the respective coding block in the reference area, and the respective bias value is equal to a median luma value of the one or more rows of luma samples.

(A5) In some embodiments of any of A1-A3, for the respective coding block, the set of one or more luma samples includes one or more rows of luma samples above the respective coding block within the reference area, and the set of one or more luma samples includes a reference luma sample that is physically located substantially at a center of the one or more rows of luma samples, and wherein the respective bias value is equal to a luma value of the reference luma sample.

(A6) In some embodiments of any of A1-A3, for the respective coding block, the set of one or more luma samples includes one or more columns of luma samples located on the left of the respective coding block in the reference area, and the respective bias value is equal to a median luma value of the one or more columns of luma samples.

(A7) In some embodiments of any of A1-A3, for the respective coding block, the set of one or more luma samples includes one or more columns of luma samples located on the left of the respective coding block within the reference area, and the set of one or more luma samples includes a reference luma sample that is physically located substantially at a center of the one or more columns of luma samples. The respective bias value is equal to a luma value of the reference luma sample.

(A8) In some embodiments of any of A1-A7, the method 700 further includes identifying (706) a first chroma component of the respective coding block and a first luma component that is co-located with the first chroma component in the respective coding block; Identifying (708) a plurality of neighboring luma components of the first luma component; and combining (714) the first luma component, the plurality of neighboring luma components, and the respective bias value to generate the first chroma component.

(A9) In some embodiments of A8, Combining the first luma sample, the plurality of neighboring luma samples, and the respective bias value to generate the first chroma component further includes reducing each of the first luma sample and the plurality of neighboring luma samples with an offset luma value. In some embodiments of A8, combining the first luma sample, the plurality of neighboring luma samples, and the respective bias value to generate the first chroma component further includes clipping each of the first luma sample and the plurality of neighboring luma samples that has been reduced with the offset luma value.

(A10) In some embodiments of A8, the offset luma value is one of: an average of the first luma sample and the plurality of neighboring luma samples, an average of luma samples in a top reference region of the reference area that is located above the respective coding block, an average of luma samples in a left reference region of the reference area that is located on the left of the respective coding block, a luma value of a single luma sample located at a top left corner of the respective coding block, a median luma value of one or more rows of luma samples located above the respective coding block within the reference area, a luma value of a luma sample that is physically located substantially at a center of the one or more rows of luma samples, a median luma value of one or more columns of luma samples located on the left of the respective coding block within the reference area, and a luma value of a luma sample that is physically located substantially at a center of the one or more columns of luma samples.

(A11) In some embodiments of A8, the video bitstream includes a respective filter index for the respective coding block of the plurality of distinct coding blocks. The method 700 further includes, for the respective coding block, adaptively selecting one of a plurality of distinct filters based on the respective filter index, each distinct filter having a respective filter shape and a plurality of weighing factors. The first luma sample, the plurality of neighboring luma samples, and the respective bias value are combined using at least the plurality of weighing factors of the selected one of the plurality of distinct filters.

(A12) In some embodiments of A11, the plurality of distinct filters includes one or more of: a first filter including nine weighing factors and configured to generate the first chroma component as a weighted combination of at least the first luma sample and eight neighboring luma samples that immediately surround the first luma sample; a second filter including seven weighing factors and configured to generate the first chroma component as a weighted combination of at least the first luma sample and six neighboring luma samples that immediately surround, and are located symmetrically with respect to, the first luma sample; and a cross-shaped filter including 4k+1 weighing factors and configured to generate the first chroma component as a weighted combination of at least the first luma sample and k neighboring luma samples that is immediately adjacent to the first luma sample from each of two row directions and two column directions, where k is a positive integer.

(A13) In some embodiments of A12, the first chroma component is generated further based on at least one of: a weighted and adjustable bias value, and a second or higher order of at least one of the first luma sample and the plurality of neighboring luma samples.

(A14) In some embodiments of any of A1-A13, the method 700 further includes for the respective coding block, identifying the reference area of the respective coding block, including in accordance with a determination that one or more color components are unavailable in a set of columns or rows, which is immediately adjacent to a boundary, excluding the set of columns or rows from the reference area.

(A15) In some embodiments of A14, the boundary includes one of a slice boundary, a super block boundary, a tile boundary, a coding block boundary, and an image frame boundary.

(A16) In some embodiments of any of A1-A15, the method 700 further includes identifying a first chroma component of the respective coding block and a first luma component that is co-located with the first chroma component in the respective coding block; identifying a plurality of neighboring luma components of the first luma component; and combining the first luma component, the plurality of neighboring luma components, and the respective bias value to generate the first chroma component. Generating the first chroma component further includes: applying a cross-shaped filter including 4k+1 weighing factors to combine the first luma sample, the plurality of neighboring luma samples, and the respective bias value. Each of two row directions and two column directions corresponds to k neighboring luma samples that is immediately adjacent to the first luma sample. The k neighboring luma samples of each of the two row directions are combined into the first chroma component in the second order, and the k neighboring luma samples of each of the two column directions are combined linearly into the first chroma component.

(A17) In some embodiments of any of A1-A15, the method 700 further includes identifying a first chroma component of the respective coding block and a first luma component that is co-located with the first chroma component in the respective coding block; identifying a plurality of neighboring luma components of the first luma component; and combining the first luma component, the plurality of neighboring luma components, and the respective bias value to generate the first chroma component. Generating the first chroma component further includes applying a cross-shaped filter including 4k+1 weighing factors to combine the first luma sample, the plurality of neighboring luma samples, and the respective bias value. Each of two row directions and two column directions corresponds to k neighboring luma samples that is immediately adjacent to the first luma sample. The k neighboring luma samples of each of the two column directions are combined into the first chroma component in the second order, and the k neighboring luma samples of each of the two row directions are combined linearly into the first chroma component.

(A18) In some embodiments of any of A1-A17, for the respective coding block, the reference area of the respective coding block includes one or more of: a top left reference region, a top reference region, a top right reference region, a bottom left reference region, and a left reference region.

(A19) In some embodiments of any of A1-A18, the CCIP mode includes a multi-chroma from luma (multi-CfL) mode. The method 700 further includes determining that the plurality of distinct coding blocks is encoded in the multi-CfL mode. In accordance with a determination that the respective coding block is encoded in the multi-CfL mode, the plurality of neighboring luma samples of the first luma sample of the respective coding block are identified based on a filter shape of a filter, and the first chroma component of the respective coding block is a weighted sum of the first luma sample, the plurality of neighboring luma samples, an output of a non-linear function of the first luma sample, and the respective bias value.

(A20) In some embodiments of any of A1-A19, the first luma sample, the plurality of neighboring luma samples, and the respective bias value are combined using a plurality of weighing factors to generate the first chroma component, and each weighing factor includes an integral portion and a fractional portion.

(A21) In some implementations, a method is implemented for encoding video data. The method includes encoding each respective coding block of a plurality of distinct coding blocks of a current image frame by identifying a first chroma component of the respective coding block and a first luma sample co-located with the first chroma component in the respective coding block, identifying a plurality of neighboring luma samples of the first luma sample, and deriving a respective bias value based on a set of one or more luma samples within a reference area of the respective coding block in the current image frame. The reference area includes one or more coding blocks that are adjacent to, and will be decoded prior to, the respective coding block. The method further includes generating a video bitstream including the plurality of distinct coding blocks of the current image frame. The video bitstream signals a cross-component intra prediction (CCIP) mode indicating each chroma component of the plurality of distinct coding blocks is determined based on one or more luma samples.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A21 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A21 above).

The proposed methods may be used separately or combined in any order. Further, each of the methods (or embodiments), encoder, and decoder may be implemented by processing circuitry (e.g., one or more processors or one or more integrated circuits). For example, the one or more processors execute a program that is stored in a non-transitory computer-readable medium. In the following, the term block may be interpreted as a prediction block, a coding block, or a coding unit, i.e., CU.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
receiving a video bitstream including a plurality of coding blocks of a current image frame, wherein the video bitstream comprises a syntax element for a cross-component intra prediction (CCIP) mode indicating whether each chroma component of the plurality of distinct coding blocks is determined based on one or more luma components;
deriving a respective bias value based on a set of one or more luma components within a reference area of a respective coding block in the current image frame, wherein the reference area includes one or more coding blocks that are adjacent to, and decoded prior to, the respective coding block;
identifying a first chroma component of the respective coding block and a first luma component that is co-located with the first chroma component in the respective coding block;
identifying a plurality of neighboring luma components of the first luma component;
generating the first chroma component by combining the first luma component, the plurality of neighboring luma components, and the respective bias value, wherein the combining includes reducing each of the first luma component and the plurality of neighboring luma components with an offset luma value; and
reconstructing the plurality of coding blocks including the respective coding block based at least on the derived bias value.

2. The method of claim 1, wherein for the respective coding block, the set of one or more luma components include a single luma component within the reference area of the respective coding block in the current image frame.

3. The method of claim 1, wherein for the respective coding block, the respective bias value is equal to an average of the set of one or more luma components including a plurality of luma components within the reference area of the respective coding block in the current image frame.

4. The method of claim 1, wherein for the respective coding block, the set of one or more luma components includes one or more rows of luma components above the respective coding block in the reference area, and the respective bias value is equal to a median luma value of the one or more rows of luma components.

5. The method of claim 1, wherein for the respective coding block, the set of one or more luma components includes one or more rows of luma components above the respective coding block within the reference area, and the set of one or more luma components includes a reference luma component that is physically located substantially at a center of the one or more rows of luma components, and wherein the respective bias value is equal to a luma value of the reference luma component.

6. The method of claim 1, wherein for the respective coding block, the set of one or more luma components includes one or more columns of luma components located on the left of the respective coding block in the reference area, and the respective bias value is equal to a median luma value of the one or more columns of luma components.

7. The method of claim 1, wherein for the respective coding block, the set of one or more luma components includes one or more columns of luma components located on the left of the respective coding block within the reference area, and the set of one or more luma components includes a reference luma component that is physically located substantially at a center of the one or more columns of luma components, and wherein the respective bias value is equal to a luma value of the reference luma component.

8. The method of claim 1, wherein combining the first luma component, the plurality of neighboring luma components, and the respective bias value to generate the first chroma component further comprises:
clipping each of the first luma component and the plurality of neighboring luma components that has been reduced with the offset luma value.

9. The method of claim 1, wherein the offset luma value is one of:
an average of the first luma component and the plurality of neighboring luma components;
an average of luma components in a top reference region of the reference area that is located above the respective coding block;
an average of luma components in a left reference region of the reference area that is located on the left of the respective coding block;
a luma value of a single luma component located at a top left corner of the respective coding block;
a median luma value of one or more rows of luma components located above the respective coding block within the reference area;
a luma value of a luma component that is physically located substantially at a center of the one or more rows of luma components;
a median luma value of one or more columns of luma components located on the left of the respective coding block within the reference area; and
a luma value of a luma component that is physically located substantially at a center of the one or more columns of luma components.

10. A method for encoding video data, comprising:
receiving video data that includes a plurality of blocks of a current frame;
determining whether a cross-component intra prediction (CCIP) mode is active for each chroma component of the plurality of blocks;
deriving a respective bias value based on a set of one or more luma components within a reference area of a respective block in the current frame, wherein the reference area includes one or more blocks that are adjacent to the respective block;

identifying a first chroma component of the respective block and a first luma component that is co-located with the first chroma component in the respective block;

identifying a plurality of neighboring luma components of the first luma component;

generating the first chroma component by combining the first luma component, the plurality of neighboring luma components, and the respective bias value, wherein the combining includes reducing each of the first luma component and the plurality of neighboring luma components with an offset luma value; and encoding the plurality of blocks including the respective block based at least on the derived bias value.

11. The method of claim 10, wherein, for the respective block, the set of one or more luma components include a single luma component within the reference area of the respective block in the current frame.

12. The method of claim 10, wherein, for the respective block, the respective bias value is equal to an average of the set of one or more luma components including a plurality of luma components within the reference area of the respective block in the current frame.

13. The method of claim 10, wherein, for the respective block, the set of one or more luma components includes one or more rows of luma components above the respective block in the reference area, and the respective bias value is equal to a median luma value of the one or more rows of luma components.

14. The method of claim 10, wherein, for the respective block, the set of one or more luma components includes one or more columns of luma components located on the left of the respective block in the reference area, and the respective bias value is equal to a median luma value of the one or more columns of luma components.

15. The method of claim 10, wherein combining the first luma component, the plurality of neighboring luma components, and the respective bias value to generate the first chroma component further comprises:

clipping each of the first luma component and the plurality of neighboring luma components that has been reduced with the offset luma value.

16. A non-transitory computer-readable storage medium storing one or more sets of instructions configured for execution by a computing device having control circuitry and memory, the one or more sets of instructions comprising instructions for:

obtaining a source video sequence that comprises a plurality of frames; and performing a conversion between the source video sequence and a video bitstream of visual media data according to a format rule;

wherein the video bitstream comprises a plurality of blocks and a syntax element for a cross-component intra prediction (CCIP) mode indicating whether each chroma component of the plurality of distinct blocks is determined based on one or more luma components; and wherein the format rule specifies that:

a respective bias value is to be derived based on a set of one or more luma components within a reference area of a respective coding block in the current image frame, wherein the reference area includes one or more coding blocks that are adjacent to, and decoded prior to, the respective coding block;

a first chroma component of the respective coding block and a first luma component that is co-located with the first chroma component in the respective coding block are to be identified;

a plurality of neighboring luma components of the first luma component are to be identified;

the first chroma component is to be generated by combining the first luma component, the plurality of neighboring luma components, and the respective bias value, wherein the combining includes reducing each of the first luma component and the plurality of neighboring luma components with an offset luma value; and the plurality of blocks including the respective block are to be reconstructed based at least on the derived bias value.

17. The non-transitory computer-readable storage medium of claim 16, wherein, for the respective block, the set of one or more luma components include a single luma component within the reference area of the respective block in the current frame.

18. The non-transitory computer-readable storage medium of claim 16, wherein, for the respective block, the respective bias value is equal to an average of the set of one or more luma components including a plurality of luma components within the reference area of the respective block in the current frame.

19. The non-transitory computer-readable storage medium of claim 16, wherein, for the respective block, the set of one or more luma components includes one or more rows of luma components above the respective block in the reference area, and the respective bias value is equal to a median luma value of the one or more rows of luma components.

20. The non-transitory computer-readable storage medium of claim 16, wherein, for the respective block, the set of one or more luma components includes one or more columns of luma components located on the left of the respective block in the reference area, and the respective bias value is equal to a median luma value of the one or more columns of luma components.

21. The non-transitory computer-readable storage medium of claim 16, wherein combining the first luma component, the plurality of neighboring luma components, and the respective bias value to generate the first chroma component further comprises:

clipping each of the first luma component and the plurality of neighboring luma components that has been reduced with the offset luma value.

* * * * *